United States Patent
Clayton et al.

(10) Patent No.: US 6,555,807 B2
(45) Date of Patent: Apr. 29, 2003

(54) SENSING STRAIN IN HYDROCARBON WELLS

(75) Inventors: Hugh R Clayton, Canterbury; Neil I Douglas, Clevedon, both of (GB)

(73) Assignee: ABB Offshore Systems Limited, Bristol (GB)

(*) Notice: Subject to any disclaimer, the term of this patent is extended or adjusted under 35 U.S.C. 154(b) by 110 days.

(21) Appl. No.: 09/729,633

(22) Filed: Dec. 4, 2000

(65) Prior Publication Data

US 2002/0040963 A1 Apr. 11, 2002

(30) Foreign Application Priority Data

Oct. 6, 2000 (GB) .............................................. 0024560

(51) Int. Cl.⁷ .................................................. H01J 5/16
(52) U.S. Cl. .............................. 250/227.16; 250/227.14
(58) Field of Search .......................... 250/231.1, 227.14, 250/227.18, 227.19, 227.16; 356/342, 32; 340/555, 556, 557, 626

(56) References Cited

U.S. PATENT DOCUMENTS 5,378,889 A * 1/1995 Lawrence .............. 250/227.16

* cited by examiner

Primary Examiner—Hung Xuan Dang
(74) Attorney, Agent, or Firm—Kirschstein, et al.

(57) ABSTRACT

An apparatus for sensing strain applied to a region of a hydrocarbon well comprises an optical fiber in communication with the region. The optical fiber is responsive to strain applied to the region and to a light signal transmitted through it, in order to produce a sensing light signal incorporating scattered light. A characteristic of the scattered light is indicative of the strain being applied to the region.

8 Claims, 5 Drawing Sheets

SENSING STRAIN IN HYDROCARBON WELLS

TECHNICAL FIELD

This invention relates to sensing strain in hydrocarbon wells. The invention is particularly concerned with sensing strain experienced by the casing of a hydrocarbon well.

BACKGROUND OF THE INVENTION

During the extraction of hydrocarbons, the medium surrounding the well, for example earth and rocks, can experience compaction. This, in turn, applies strain to the casing of the hydrocarbon well. It is desirable to be able to monitor the strain being experienced by the casing.

Previous sensing arrangements have incorporated a number of strain gauges fitted to the casing. However, the casing is typically several kilometers long, necessitating a large number of strain gauges and a complex arrangement to extract strain data from each sensor.

SUMMARY OF THE INVENTION

The invention provides apparatus for sensing strain applied to a region of a hydrocarbon well, comprising an optical fiber in communication with the region, the optical fiber being responsive to strain applied to the region and to a light signal transmitted through it, in order to produce a sensing light signal incorporating scattered light, wherein a characteristic of the scattered light is indicative of the strain being applied to the region.

Preferably, the characteristic of the scattered light being monitored is so-called Brillouin scattering.

The provision of a single optical fiber in order to sense strain being applied along a relatively large area simplifies the sensing of strain.

The invention will now be described, by way of example, with reference to the accompanying drawings.

DETAILED DESCRIPTION OF THE INVENTION

Figure 1:
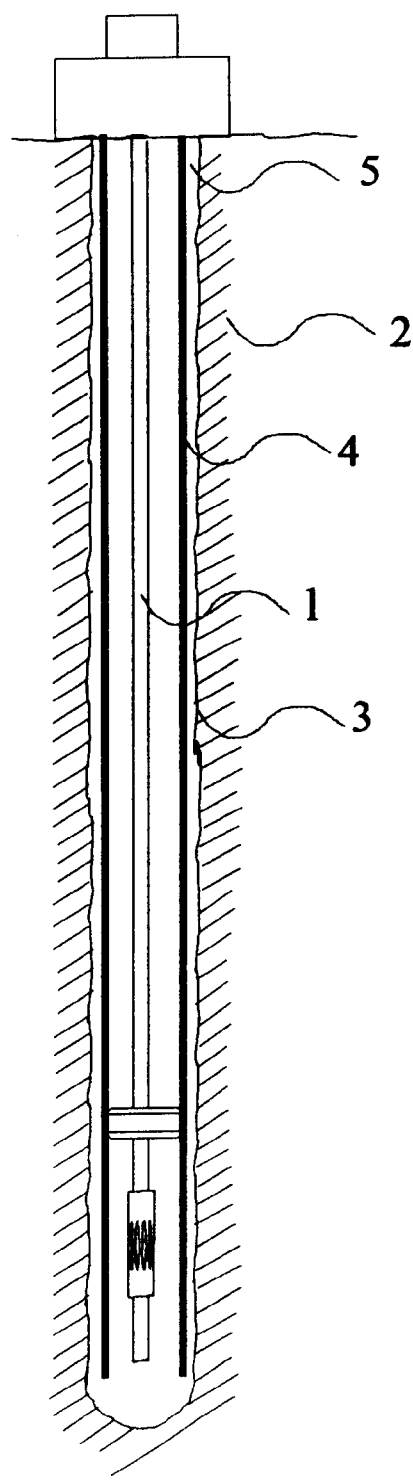
FIG. 1 is a schematic cross sectional drawing of a hydrocarbon well.

FIG. 1 shows a cross section view of a typical arrangement of a well, from which hydrocarbon fluids or gases may be extracted via production tubing 1. During the extraction process the medium 2 around the casing, adjacent the bore 3, can suffer compaction. This results in substantial stresses being applied to the casing 4, via the cement 5 which is injected between the bore and the casing at installation. It is beneficial to monitor the strain in the casing resulting from the compaction stresses.

Figure 2:
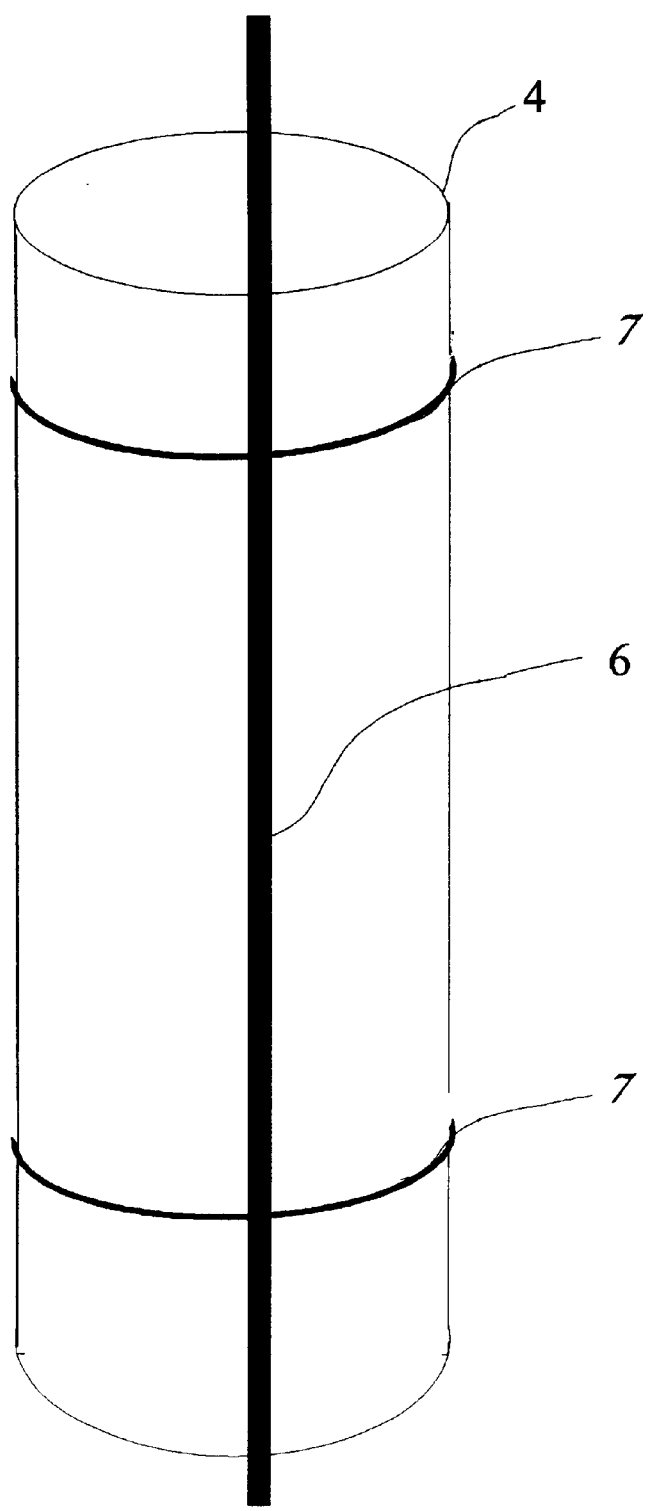
FIG. 2 illustrates a region of the casing of the hydrocarbon well of FIG. 1, incorporating a sensor constructed according to the invention.

Referring now to FIG. 2, in accordance with the invention there is provided an optical fiber 6 in communication with the casing. FIG. 2 shows a section of the length of the casing 4 with the fiber 6 strapped to the casing 4 by straps 7 in a simple vertical geometry. During installation, the casing 4 is lowered into the bore 3 with the optical fiber 6 attached. The assembly is then bonded to the casing/rock formation by a cementation program i.e. the normal process of injecting cement or concrete into the space between the medium 2 surrounding the bore 3 and the casing 4. Strain imparted to the optical fiber (via the cement or concrete) can be sensed by making use of an optical effect known as Brillouin back-scatter.

Figure 3:
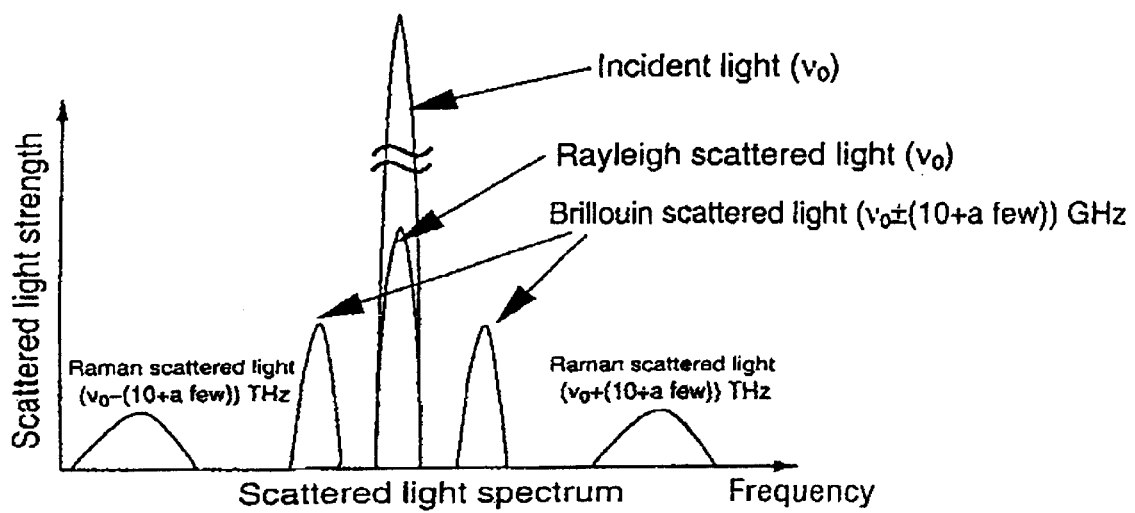
FIG. 3 illustrates a typical sensing light signal from the apparatus of FIG. 2.

When a high intensity light pulse of a very narrow linewidth is coupled into an optical fiber, a number of different back-reflected signals are generated at each point along the fiber. FIG. 3 depicts a typical scattered light spectrum in an optical fiber. The spectrum is composed of Rayleigh back-scattered light of a frequency identical to that of the original source but with a much reduced amplitude. Added to this is the so-called Raman back scattered light which has up and down-shifted frequency components called stokes and anti-stokes, respectively; and finally, Brillouin scattering signals also with up- and down-shifted frequency components. It can clearly be seen that the frequency shift in the case of the Brillouin scatter is much smaller than that for Raman. Brillouin is in the order of GHz, while the Raman is in the THz range. The other main difference is that the Brillouin scatter is at least two orders of magnitude stronger in intensity compared to Raman.

Rayleigh scattering is related to inhomogeneities due to the material structure of the optical fiber. Small refractive index fluctuations scatter light in all directions without changing the frequency of the scattered light. Raman scattering occurs when light is absorbed by molecules and re-emitted at different frequencies. Brillouin scattered light occurs as a result of the interaction between a highly coherent incident light source and an acoustic wave generated within the guiding material, i.e. the fiber. The scattered light experiences a Doppler frequency shift, because the pressure variations of the acoustic wave are periodic and travelling in the material. This frequency shift is known as Brillouin frequency shift and is dependent on the material and its acoustic wave velocity. Typical Brillouin shifts are of the order of +/−13 GHz for incident light at 1.33 um, and of +/−11 GHz for incident light at 1.55 um. The key characteristic of the Brillouin scattering is that its frequency shift is strain dependent, with a coefficient of 433 MHz/% of strain @ 1.55 um of incident light.

Figure 4:
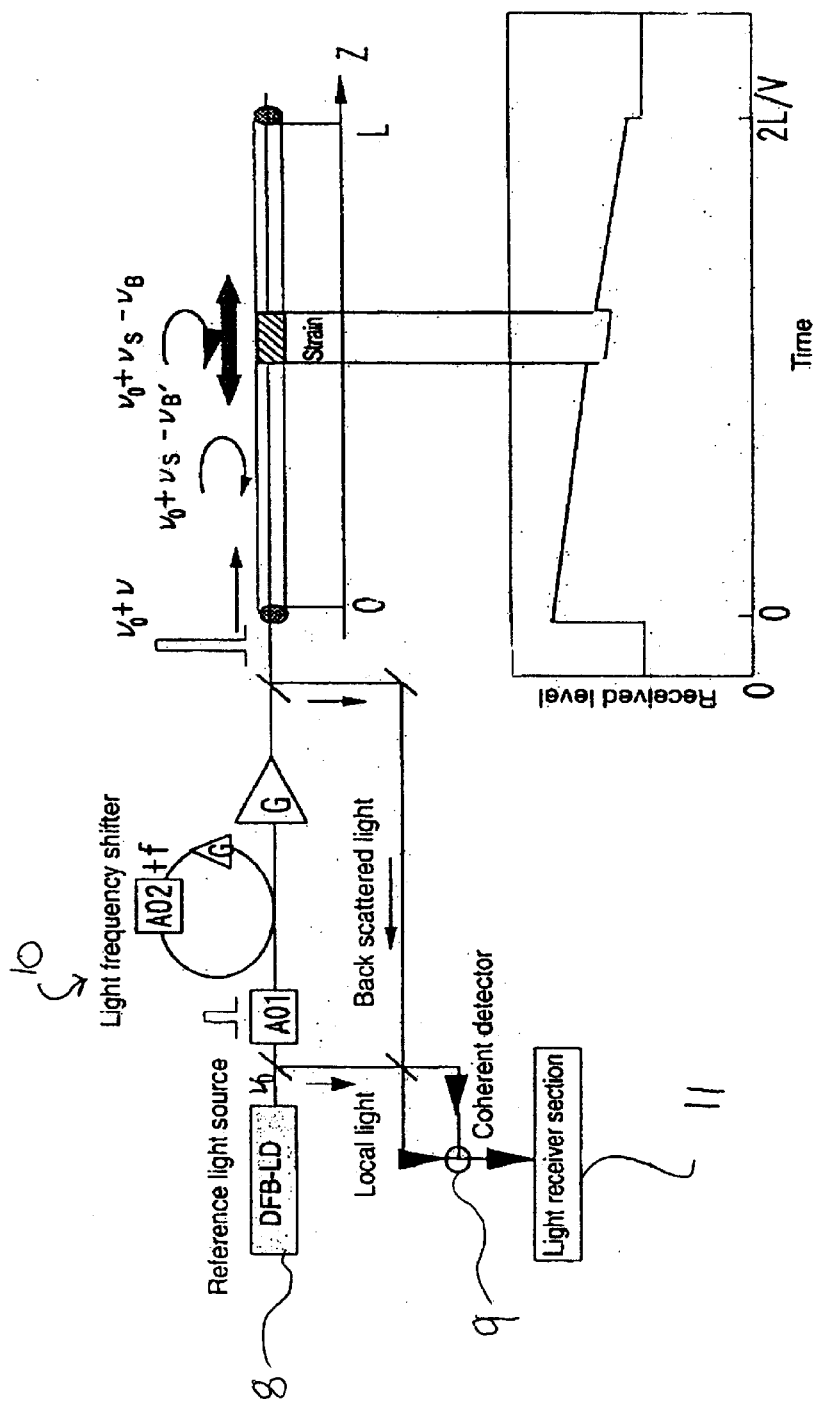
FIG. 4 shows schematically the light sensing and transmitting apparatus of the present invention.

The basic architecture of the interrogation system employed to transmit light through the fiber, and to detect scattered signals, is shown in FIG. 4. A Distributed Feed-Back (DFB) laser 8 is used as a light source and reference source. The centre frequency of this source is at $v_o$. The light is split into two signals, one acting as the reference signal in a coherent detector 9, the other fed into light modulators and a frequency shifter 10. The light modulators are indicated by the references A01 and A02. These modulators are acousto-optic modulators; they modulate the incoming continuous source light into standard pulse light. The frequency shifter 10 then adds a variable frequency shift to the light pulse. The light pulse, at frequency $v_o+v_s$, is injected into the optical fiber. The back-reflected light returning to the same fiber end will be the sum of the Rayleigh and Brillouin scattered light. This returned signal is then mixed with the local reference light signal and fed into the coherent detector 9 and thus to an analyser 11. The component marked "G" in the Figure denotes an optical fiber amplifier (to obtain gain). In practice the dynamic range of strain measurement is limited, typically, to about 3% due to the maximum frequency shift that can be detected by the instrument i.e. bounded between 9.9 GHz to 11.9 GHz.

Figure 5:
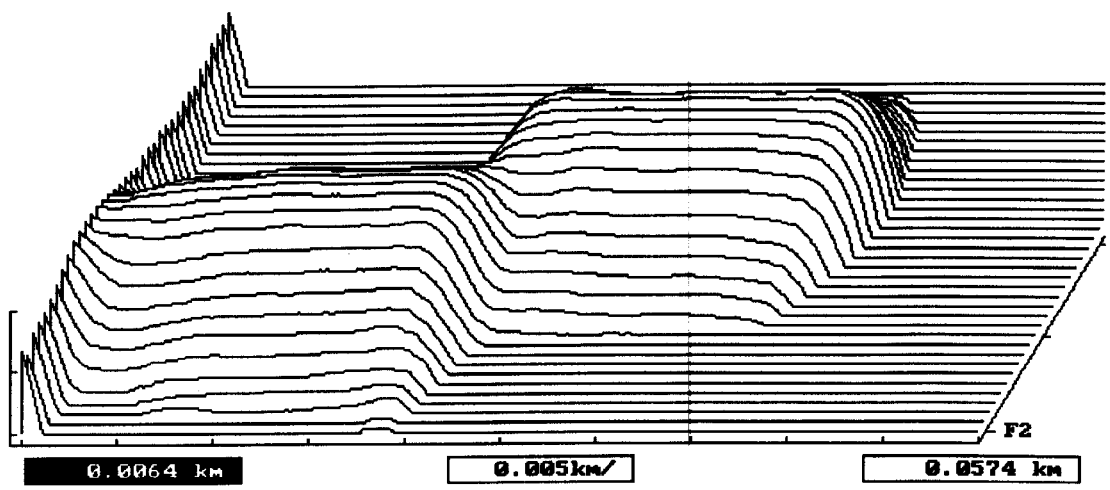
FIG. 5 illustrates a typical trace from the analyser of FIG. 4.

FIG. 5 shows a typical trace on the screen of the analyser 11. The horizontal axis denotes the fiber length in kilometers. The vertical axis shows signal strength. The third axis (coming out and going into the page) is the frequency axis. When the fiber experiences strain along its long axis, the Brillouin backscatter signal at that point will shift in frequency. From this frequency shift, the applied strain and thus stress is determined. The illustration of FIG. 5 is of a forty meters long section of a fiber strain sensor. The first twenty meters of the fiber (measured from the left) are resting without strain. The last twenty meters of the fiber sample are with induced strain. Note the shift of the Brillouin signature to lower frequencies.

Optical fiber sensors are attractive because of their small size, light weight, EMI immunity and galvanic isolation, high sensitivity, and capacity for distributed sensing.

Other fiber optic techniques, such as employing Bragg gratings written into the fiber, may also result in a fiber that is sensitive to both temperature and strain. However a technique that leaves the fiber pristine is preferred, such as the aforedescribed Brillouin back scatter technique, because techniques such as Bragg gratings result in a reduced maximum strain capability of the fiber resulting from writing the grating on to it. Even a pristine fiber has the limitation of a maximum strain of about 6%. The higher strain capability of the pristine fiber is important when long fiber lengths are required for wells. A further advantage of applying the Brillouin technique is that it is less sensitive to temperature, although the variation in temperature after the casing has been installed is relatively small. If temperature monitoring is also required, the Raman back-scatter, shown in FIG. 3, can be monitored instead.

In the past, several bench-top prototype systems of distributed strain measuring, using Brillouin scattering, have been developed. These systems used counter propagating light signals, using Brillouin amplification between a high intensity pump light pulse and a CW probe light pulse. However, one drawback of this technique is the need for a pair of highly stable, frequency-stabilized, light sources at each end of the fiber. By contrast, the system shown in FIG. 4 involves only one end of the optical fiber and employs the methods of coherent detection and light frequency conversion to accurately detect the Brillouin frequency shift along each point in the fiber.

Thus the advantage of the invention is that distributed monitoring of the strain of the casing is achieved without the need for a multiplicity of separate sensors, and the interface to the system is reduced to a single fiber optic connection.

On a practical point, it is known that optical fibers are inherently fragile and it is normal practice to form a cable from the fiber by protecting it in a sheath. The design of this sheath is crucial because it has to protect the fiber from the harsh environment down-hole and yet at the same time transmit the strain experienced by the casing to the fiber. Thus, the sheath has to protect the fiber from becoming opaque in the presence of fluids involved in the fluid extraction business and naturally occurring fluids such as hydrogen gas. Typically, the fiber is housed in a metal tube and is pre-stressed before being bonded to the tube by means of a strain transmitting bonding agent. This enables the fiber to be sensitive to both tension and compression forces as a result of compaction in the well.

The installation of the single fiber cable, with a single interface, is therefore relatively simple, resulting in substantial installation cost reduction. Furthermore the reliability of the monitoring system is greatly improved, due to the fiber being a single passive device, and the interface connections being reduced to one.

On a further practical point, interfacing with the analyser is fairly straightforward. It an be remotely controlled typically via a GPIB, RS232 or parallel port. Offline interpretation can be done on any computer with the emulation software that is provided with the analyser. The analyser has a working temperature range of typically +10° C. to +40° C. Therefore if the natural environmental conditions are expected to exceed these limits, the analyser will have to be located in a controlled environment location. It should also be noted that the analyser is typically rated for non-hazardous area operation only. One analyser can interrogate multiple fibers (wells), but can only interrogate one fiber at a time and the switching between different fibers can vary in complexity. Multiple fibers could be brought back to an optical switch for single location interrogation. If the wells are too far spaced apart, it may be necessary to move the analyser to each well location as required.

What is claimed is:

1. Apparatus for sensing strain applied to a region of a hydrocarbon well, comprising an optical fiber in communication with the region, the optical fiber being responsive to strain applied to the region and to a light signal transmitted through it, in order to produce a sensing light signal incorporating scattered light, wherein a characteristic of the scattered light is indicative of the strain being applied to the region.

2. Apparatus as claimed in claim 1, in which the characteristic of the scattered light is Brillouin scatter.

3. Apparatus as claimed in claim 1 further comprising a laser arranged to generate the light signal.

4. Apparatus as claimed in claim 3, in which a portion of light from the laser acts as a local reference.

5. Apparatus as claimed in claim 1 in which light is transmitted and sensed at the same end portion of the optical fiber.

6. A hydrocarbon well incorporating apparatus for sensing strain as claimed in claim 1.

7. A method of sensing strain in a hydrocarbon well, comprising transmitting a light signal in an optical fiber, detecting a light signal scattered in the fiber and deriving an indication of strain in dependence on a characteristic of the scattered light.

8. A method as claimed in claim 7, in which the indication of strain is derived from Brillouin scatter of the light signal.

* * * * *